United States Patent [19]
Wijesinghe et al.

[11] Patent Number: 5,176,055
[45] Date of Patent: Jan. 5, 1993

[54] BANDMILL WITH AUTOMATIC TRACK AND STRAIN CONTROL SYSTEM

[75] Inventors: Ralph Wijesinghe, Vancouver; Edward Komori, Surrey, both of Canada; Joseph LaChapelle, Corvallis; Mark L. Carter, Springfield, both of Oreg.

[73] Assignee: Seneca Sawmill Company, Eugene, Oreg.

[21] Appl. No.: 728,038

[22] Filed: Jul. 8, 1991

Related U.S. Application Data

[63] Continuation of Ser. No. 151,803, Feb. 3, 1988, abandoned, which is a continuation-in-part of Ser. No. 22,096, Mar. 5, 1987, abandoned.

[51] Int. Cl.⁵ ............................................. B27B 13/08
[52] U.S. Cl. ........................................ 83/72; 83/76.7; 83/817; 83/819
[58] Field of Search ............... 83/61.2, 72, 76.7, 789, 83/814, 816, 817, 818, 819, 661, 13; 51/135 BT

[56] References Cited

U.S. PATENT DOCUMENTS

| | | | |
|---|---|---|---|
| 1,704,428 | 3/1929 | Dempewolf et al. | 83/818 |
| 2,307,190 | 1/1943 | Bell . | |
| 3,838,620 | 10/1974 | Baldrey et al. | 83/819 |
| 4,356,750 | 11/1982 | Legler et al. | 83/816 |

FOREIGN PATENT DOCUMENTS 895668  3/1972  Canada ................................. 83/817

OTHER PUBLICATIONS

"Feedback Control of the Running Position of a Band Saw with an Actuator", Hattori et al, Mokuzai Gakkaishi vol. 28, No. 12, pp. 783-787, 1982.
"Band Saw Mill of Benjamin & Fischer", Title, Publisher and Publication Date Unknown.
"Bandmill Having Moveable, Tiltable Wheel for Controllably Straining and Tracking Saw" Wijesinghe et al, Mar. 1985.

Primary Examiner—Hien H. Phan
Attorney, Agent, or Firm—Dellett, Smith-Hill and Bedell

[57] ABSTRACT

A bandmill has first and second wheels and an endless saw blade trained about the wheels. The wheels are mounted to rotate about respective axes which lie in a common plane, but the first wheel is adjustable in position relative to the second wheel with respect to both its distance from the second wheel and its orientation relative to the second wheel. A tensioning mechanism is effective to force the first wheel away from the second wheel, while maintaining the axes of rotation of the two wheels substantially parallel, in response to a signal which is provided by a load cell and represents the tension in the saw blade. A wheel tilt mechanism is effective to adjust the angular position of the first wheel relative to the second wheel in response to a signal indicating the path followed by the saw blade, for maintaining the blade on a proper path.

26 Claims, 9 Drawing Sheets

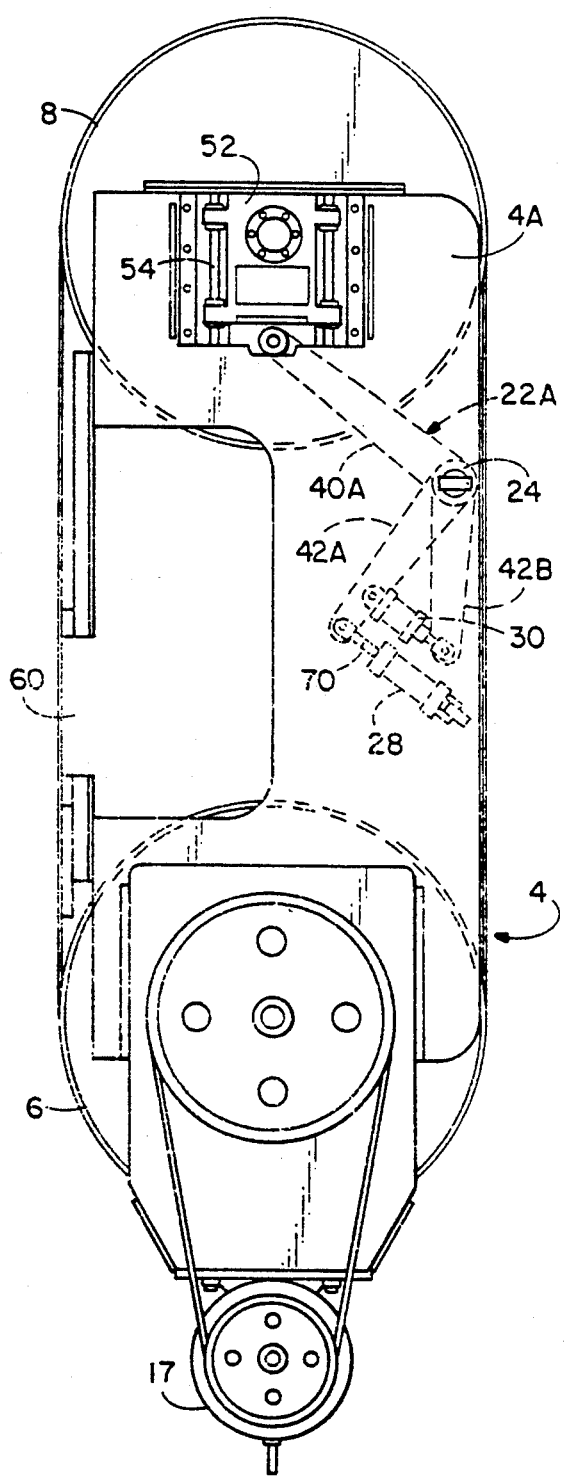
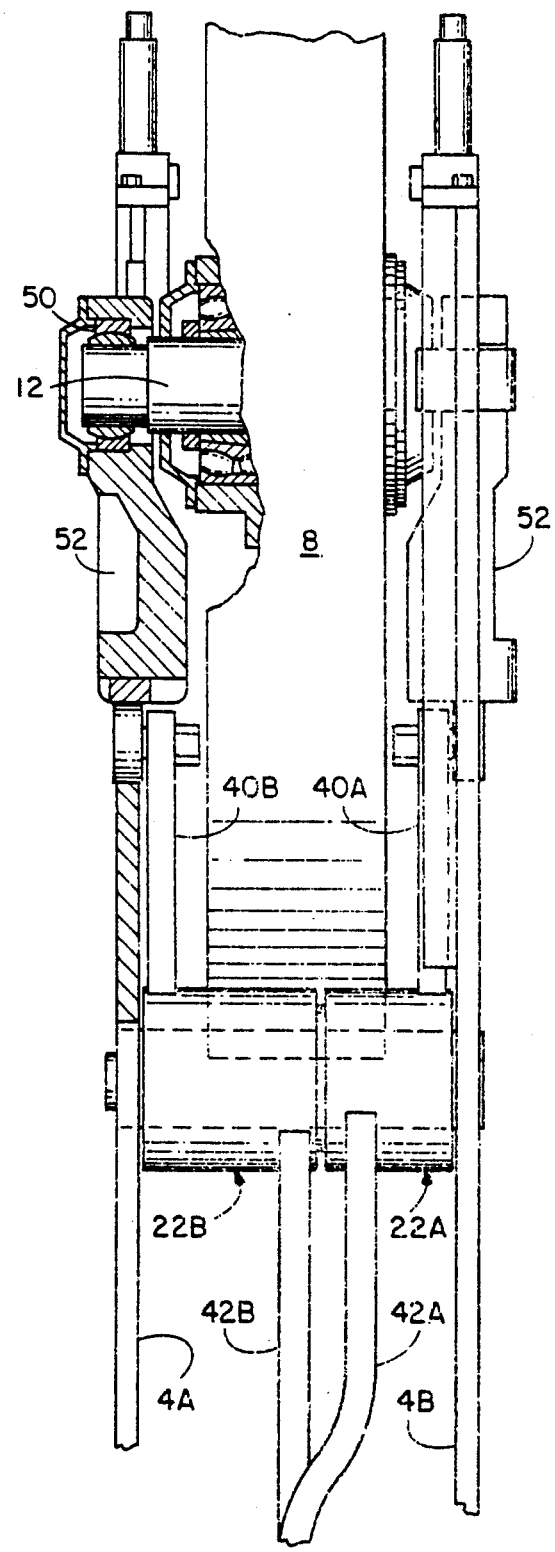
FIG. 1
FIG. 5

BANDMILL WITH AUTOMATIC TRACK AND STRAIN CONTROL SYSTEM

CROSS REFERENCE TO RELATED APPLICATION

This is a continuation of application Ser. No. 07/151,803 filed Feb. 3, 1988 and now abandoned, which is a continuation-in-part of co-pending application Ser. No. 07/022,096 filed Mar. 5, 1987, now abandoned.

BACKGROUND OF THE INVENTION

This invention relates to a bandmill having an automatic track and strain control system.

A bandmill is used for cutting lumber. A conventional vertical bandmill comprises a support frame, two wheels, one disposed vertically above the other, and an endless saw blade trained about the wheels. The lower wheel is driven and the upper wheel idles. The blade is maintained under tension, and accordingly when the lower wheel is driven the blade passes endlessly about the wheels. A cutting throat is provided between the upper and lower wheels along the downward run of the blade. In order to ensure that the blade remains in position on the wheels, the wheels are crowned and their relative positions are accurately determined so that the plane containing the maximum circumference of the upper wheel coincides with the plane containing the maximum circumference of the lower wheel. This need for accurate positioning of the wheels implies that the conventional bandmill is expensive to construct because a massive support structure is required in order to support the wheels with the required degree of stability.

The support structure that is conventionally used for a bandmill comprises a concrete base and a support frame mounted on the base. The support frame includes a mechanism for adjusting the vertical position of the upper wheel, whereby the tension in the blade can be adjusted. However, if the upper wheel is moved, it is then necessary to readjust the relative positions of the wheels to achieve precise coincidence of the planes containing the maximum circumference of the two wheels.

Sometimes, it is desirable to employ a bandmill in which the blade passes through the cutting throat in the horizontal direction, or at an angle that is inclined to the horizontal. However, the support structure of the vertical bandmill does not permit ready adjustment of the orientation of the bandmill. The nature of the support structure also implies that the orientation in which a given bandmill will be used is fixed at the time of manufacture, and accordingly it is necessary to build distinct bandmills for vertical, horizontal and inclined use.

The support structure for the conventional bandmill is not only massive but is also bulky. If two conventional bandmills are disposed in the same orientation and on the same side of the cutting path, they can not be any closer together than about two feet. It is proposed in co-pending application Ser. No. 07/089,489 filed Aug. 21, 1987, that a sawmill should be provided in which any three bandmills out of a group of four bandmills act on a single log on a single pass of the log through a bandmill station. The four bandmills are stationary with respect to the direction of feed of the log through the group of bandmills. The sawmill is designed to process logs that are only eight feet long. The cutting edges of the saw blades must therefore be closer together than about two feet, since otherwise the sawing by the upstream bandmill will be completed before the log starts to be sawn by the downstream bandmill, and this may create difficulties in log handling.

During sawing, the saw blade of a conventional bandmill vibrates in the cutting throat. If the blade is dull or the feed rate is high, the blade tends to snake out of the desired cutting plane as a log is fed through the throat. Consequently, lumber with rough surfaces or of uneven thickness is produced. Moreover, snaking may result in the blade being deflected to such an extent that it strikes other parts of the bandmill, resulting in damage to the bandmill. Hitherto, these problems have been addressed by using a thicker blade, which results in greater kerf loss, or increasing the blade tension, which results in higher maintenance costs.

When the blade of a bandmill is deflected, e.g., due to nonuniformities in the log being cut, there is a tendency for blade oscillations to occur, resulting in thicker kerf and impaired accuracy.

The stress distribution in the blade of a bandmill depends on the path followed by the blade relative to the wheels, and the stress distribution has a bearing on sawing accuracy. It has been found that improved accuracy is obtained if the bottoms of the gullets of the teeth are maintained close to the edges of the wheels, so that the stiffness of the blade in the teeth area is maximized. However, if the gullets pass over the wheels, there is a tendency for the saw blade to crack in the vicinity of the gullets.

SUMMARY OF THE INVENTION

A preferred embodiment of the present invention in its first aspect is a bandmill having at least first and second wheels and an endless saw blade trained about the wheels. The wheels are mounted to rotate about respective axes which lie in a common plane, but the first wheel is adjustable in position relative to the second wheel with respect to both its distance from the second wheel and its orientation relative to the second wheel. A tensioning mechanism is effective to force the first wheel away from the second wheel, while maintaining the axes of rotation of the two wheels substantially parallel, in response to a signal which is provided by a load cell and represents the tension in the saw blade. A wheel tilt mechanism is effective to adjust the angular position of the first wheel relative to the second wheel in response to a signal indicating the path followed by the saw blade, for maintaining the blade on a proper path.

By providing for adjustment of the tilt of the first wheel, it is possible to avoid the need for the massive support structures that are used in conventional bandmills, since the tilt mechanism maintains the saw blade on the proper path. The tensioning mechanism enables a high blade tension to be achieved, so that the amplitude of blade vibration is reduced, and this results in consistent sawing. However, the tension is controlled so that it remains low enough that unacceptable maintenance costs are avoided.

A preferred embodiment of the present invention in a second aspect is bandmill apparatus comprising at least first and second wheel arbors each having first and second opposite ends and each defining a central axis, and a support structure which supports the first and second wheel arbors with their central axes lying in a common plane. The support structure comprises two columns which are held in stationary, spaced-apart relationship and each of which receives one end of each of the wheel arbors. First and second wheels are mounted on the first and second arbors respectively, in the space between the two columns, and are rotatable with respect to the support structure about the central axes of the arbors respectively.

Use of such a support structure ensures that when the support structure is moved, the wheel arbors remain in the same relative positions unless one or both of the wheel arbors is moved relative to the support structure, and this in turn permits the orientation of the bandmill apparatus to be changed, e.g., from a vertical orientation to a horizontal orientation, without its being necessary to dismantle and rebuild the entire bandmill apparatus. This in turn implies that a given bandmill can be installed in any orientation.

BRIEF DESCRIPTION OF THE DRAWINGS

For a better understanding of the invention, and to show how the same may be carried into effect, reference will now be made, by way of example, to the accompanying drawings in which:

FIG. 1 is a side elevation of a horizontal two-wheel bandmill embodying the present invention, FIG. 5 is a partial vertical sectional view of the FIG. 1 bandmill illustrating the idler wheel and the tilt and strain mechanism.

Figure 2:
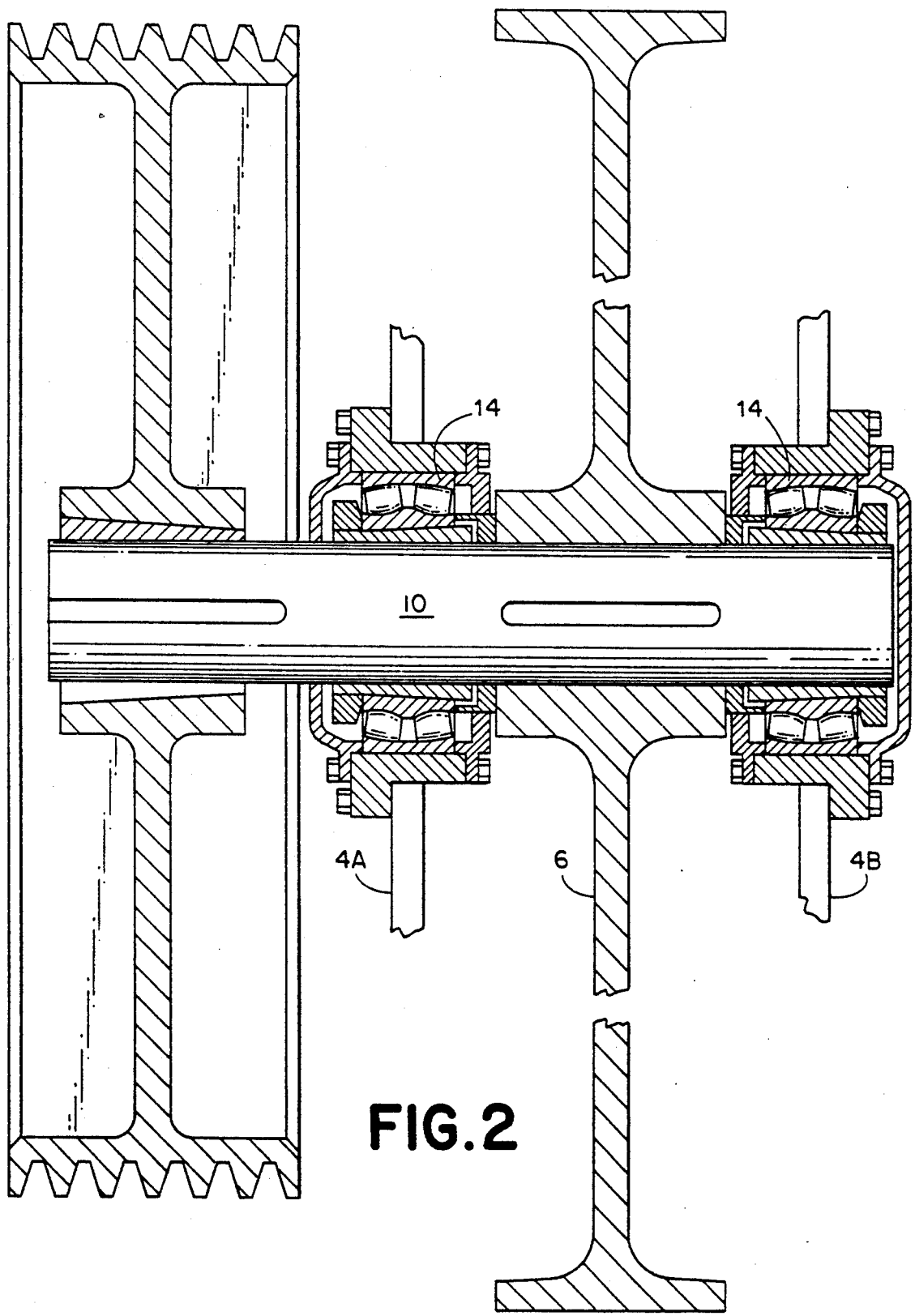
FIG. 2 is a sectional view to an enlarged scale showing the manner of mounting of the driven wheel of the FIG. 1 bandmill.

The FIG. 1 bandmill is illustrated in the drawings in a vertical orientation. However, it is disposed horizontally when in use.

Figure 11:
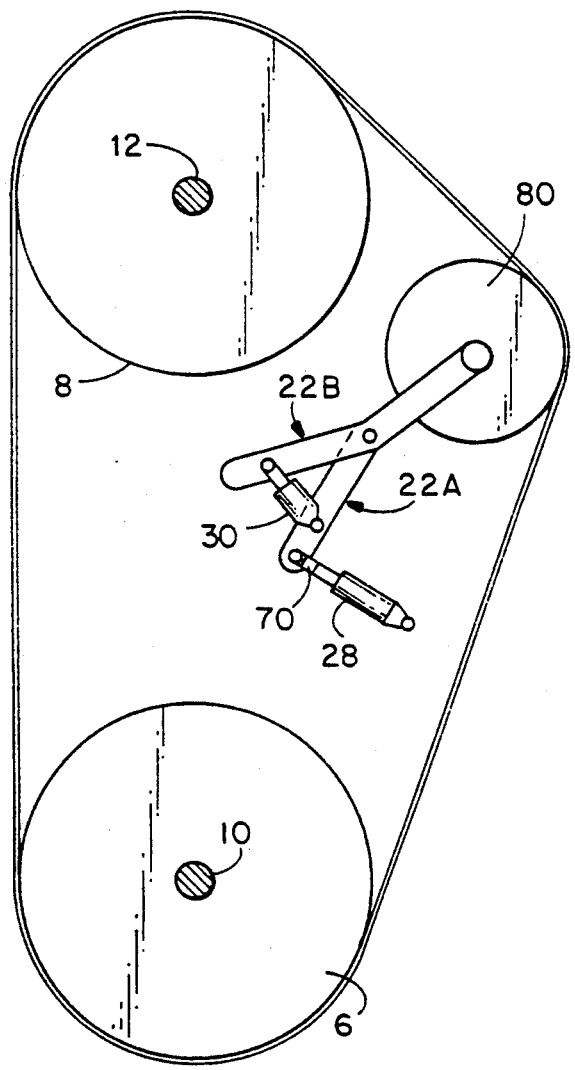
FIG. 11 is a simplified side view of a threewheel bandmill embodying the present invention.
Figure 12:
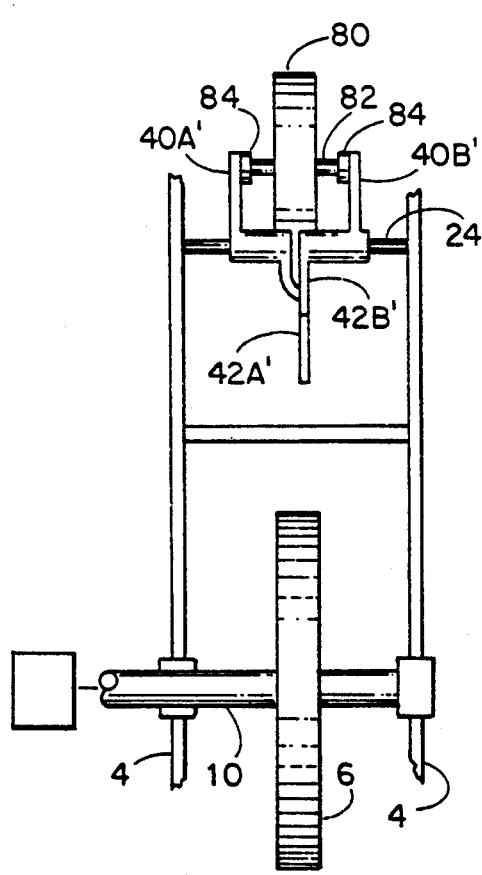
FIG. 12 is a sectional view of the FIG. 11 bandmill, taken on the line XII—XII of FIG. 11.

In the different figures of the drawings, like reference numerals denote corresponding elements. In FIGS. 11 and 12, primed reference numerals denote elements having similar functions to the elements denoted by the corresponding unprimed numerals in FIG. 9.

DETAILED DESCRIPTION

Figure 6:
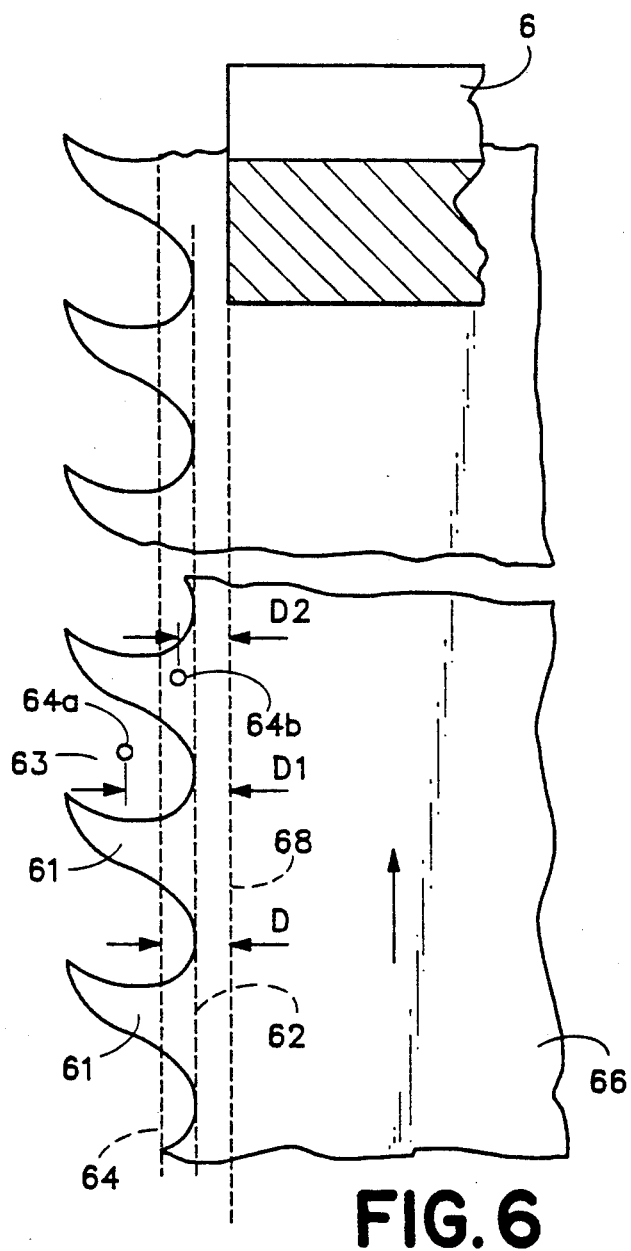
FIG. 6 illustrates part of the blade of the FIG. 1 bandmill and shows features relevant to the positioning of sensor units.
Figure 7:
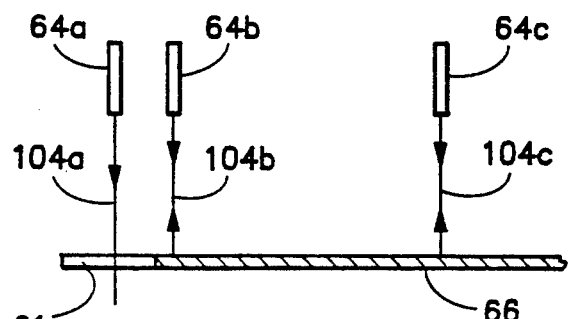
FIG. 7 illustrates the arrangement of sensor units relative to the blade.

The bandmill illustrated in FIGS. 1-8 comprises a support frame 4, a driven wheel 6, an idler wheel 8, and an endless saw blade 66, which is shown in FIGS. 6 and 7 but not in FIGS. 1-5. The support frame 4 comprises two rigid steel columns 4A and 4B which are held in spaced apart, parallel relationship, e.g. by plates 4C that are welded to the columns 4A, 4B. As shown in FIG. 2, the driven wheel 6 is keyed to an arbor 10 which is journalled in bearings 14. The bearings 14 are mounted in the columns 4A, 4B respectively. The wheel 6 is coupled by way of the arbor 10 to a hydraulic drive motor 17, which receives hydraulic fluid under pressure from a pump 32 (FIG. 8) by way of a valve 34, which is controlled by a solenoid 134. The valve 34 has a first position in which it delivers fluid under pressure from the pump 32 to the motor 17, for driving the motor, and a second position in which it prevents delivery of fluid to the motor. The coupling between the motor 17 and the arbor 10 is through sheaves and belts, but it may alternatively be a direct drive coupling. The idler wheel 8 (FIG. 3) is journalled on an arbor 12 by means of bearings 16. The arbor 12 is supported at its two opposite ends in spherical bearings 50 which are themselves supported in respective carriages 52. The carriages 52 are slidable along rods 54 which are secured rigidly to the support frame 4, bearings 53 being disposed between the carriages 52 and the rods 54.

Figure 8:
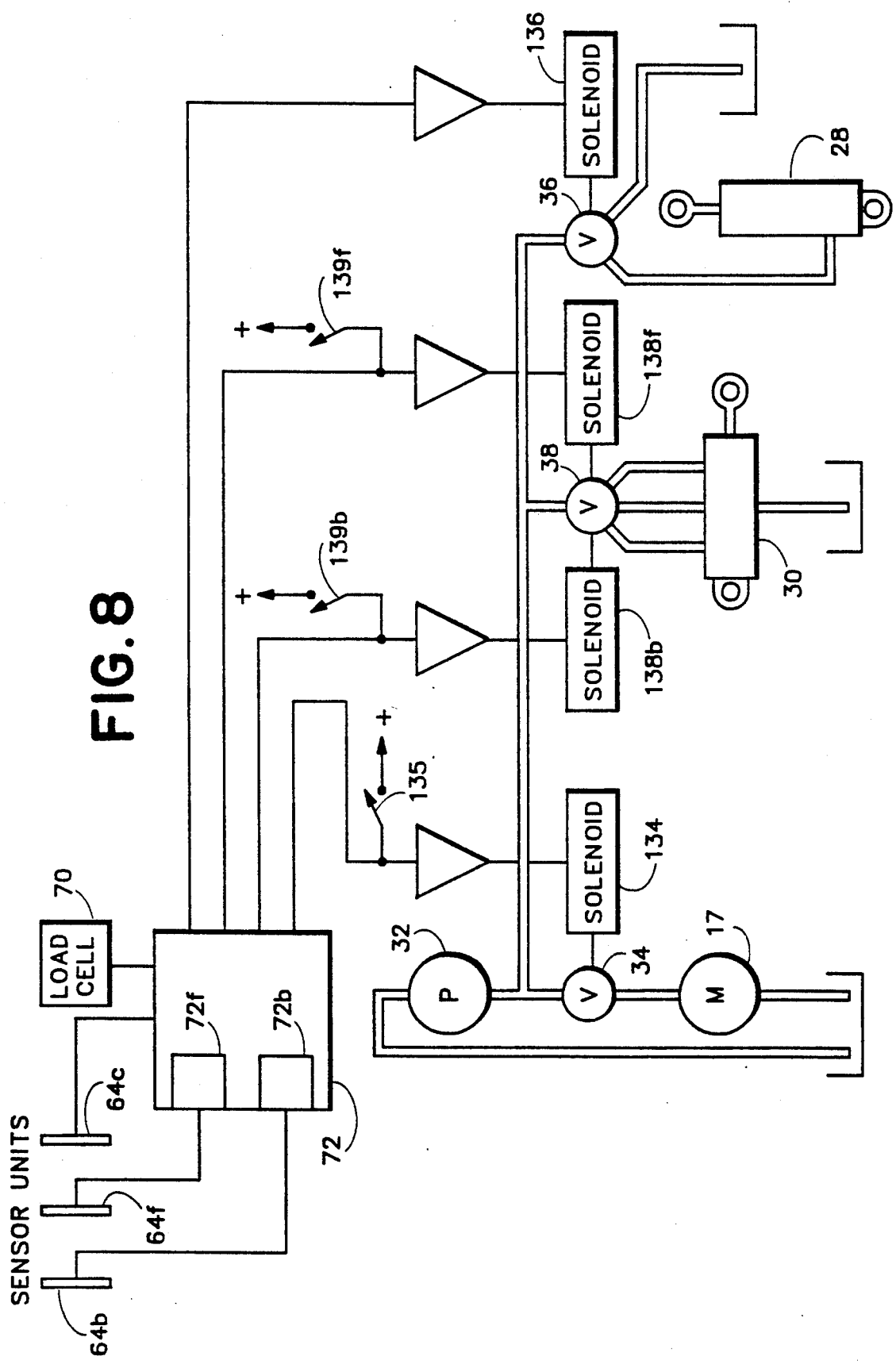
FIG. 8 illustrates the control circuit for the tilt and strain mechanisms.

A differential lever assembly comprising two cranked levers 22A and 22B (FIGS. 1, 4, 5) is mounted on a shaft 24 of the support frame 4 by way of sleeve bearings. The lever assembly is accommodated between the two columns 4A, 4B. Each lever 22 has two arms 40 and 42. At their ends farther from the shaft 24, the arms 40 carry rollers which engage wear plates on the carriages 50 respectively. At its end farther from the shaft 24, the arm 42A is coupled to the support frame by way of a single-acting hydraulic cylinder 28 and is coupled to the arm 42B by way of a double-acting hydraulic cylinder 30. As shown in FIG. 8, the cylinders 28 and 30 are connected to the pump 32 by way of respective valves 36 and 38. The valve 36 is a servo valve that is controlled by a solenoid 136 and delivers fluid under pressure to the cylinder 28 to extend the cylinder, or allows hydraulic fluid to leave the cylinder, so that the cylinder can retract, at a rate dependent on the magnitude of the current received by the solenoid 136. The valve 38 is controlled by two solenoids 138b and 138f and has a first position in which it delivers fluid under pressure to one chamber of the cylinder 30 and allows fluid to leave the other chamber of the cylinder 30, a second position in which it allows fluid to leave the one chamber and delivers fluid under pressure to the other chamber, and a third position in which fluid does not enter or leave either chamber except through leakage.

Upon delivery of fluid under pressure to the cylinder 28, the lever assembly is urged to pivot about the axis of the shaft 24 in the clockwise direction shown in FIG. 1, with the relative angular positions of the arms 42 depending on the condition of the valve 38. The carriages 50 are forced away from the wheel 6 (to the left of FIG. 1) and the wheel 8 also is forced away from the wheel 6. In this manner, the saw blade is placed under tension. The differential nature of the lever assembly allows the arbor 12, and the Wheel 8 carried thereby, to be tilted to a selected extent relative to the arbor 10 and the wheel 6.

A load cell 70 is interposed between the cylinder 28 and the arm 42A and provides a pressure signal representative of the force exerted by the cylinder 28 on the lever 22A. The tension in the saw blade 12 depends upon the force exerted by the cylinder 28, and the pressure signal provided by the load cell 70 is applied to a programmable logic controller (PLC) 72 (FIG. 8). The PLC 72 compares the tension value indicated by the pressure signal with a pre-set range of values. If the tension value indicated by the pressure signal is outside the pre-set range, the PLC provides a current to the solenoid 136 of appropriate magnitude and direction, using an analog PID control loop, to restore the indicated tension value to the pre-set range of values. In this manner, the tension in the saw blade is maintained substantially constant. In the event that the pressure signal starts to vary in oscillating fashion, implying that the blade is oscillating, the controller 72 adjusts the valve 36 so as to damp the oscillation without reducing the blade tension substantially.

FIG. 6 illustrates a portion of the saw blade 66 in plan, at a location in the cutting throat. It will be seen from FIG. 6 that each tooth 61 is generally triangular in form and that adjacent teeth are separated by gullets 63.

The plane of the forward edge of the driven wheel 6 (the upstream edge with respect to the direction of lumber flow) intersects the plane defining the nominal position of the blade 66 in the cutting throat in a line 68. For proper operation of the bandmill, the line 62 that defines the base of the gullets must lie just forward of the line 68. It is desirable that the line 62 be 1/16" +/−1/16" forward of the line 68.

Three sensor units 64b, 64f and 64c are mounted above the plane of the lower run of the blade 66, just upstream (with respect to the direction of movement of the blade) of the cutting throat 60. The sensor units 64 are used to sense the presence of the blade or its teeth at predetermined locations. It is known to use inductive sensors to sense the presence of a metal object, such as a saw blade, but the short range of conventional inductive sensors renders them less than optimal for detecting whether the blade of a bandmill is at a desired position. Thus, the blade is likely to depart from its nominal path by a distance greater than the range of an inductive sensor, resulting in a possibility that the blade will strike the sensor and destroy it. Therefore, use of photoelectric sensor units is preferred. In the preferred embodiment of the invention, each sensor unit is of the kind manufactured by Banner Engineering Corp. and sold under the designation SBCI-6. The sensor unit includes a light source (a light-emitting diode) and a photodetector (a photodiode). As shown in FIG. 7, each sensor unit 64 emits a light beam along an optical axis 104. The light beam is directed towards the saw blade. Light incident on the saw blade creates a reflected beam which is collected by the sensor unit 64 and is directed onto the photodetector. The LED is imaged onto the photodetector if the saw blade is at a distance of from 5 to 7 inches from the sensor unit. The sensor unit provides a 24 volt d.c. output signal if the LED remains imaged on the photodetector for a time longer than the response time of the sensor unit, and otherwise its output is at 0 volts. The output signals provided by the sensor units are applied to the PLC 72. In order to immunize the sensor unit from the influences of ambient light, the light beam provided by the sensor unit is modulated in intensity at 10 kHz and the signal provided by the photodetector is demodulated against a reference signal at 10 kHz. Demodulation occurs over 10 cycles of the reference signal, and accordingly the response time of the sensor unit is 1 ms.

The optical axis 104b of the sensor unit 64b is vertical and intersects the plane of the blade at a distance D1 from the line 68. The optical axis 104f of the sensor unit 64f is vertical and intersects the plane of the blade at a distance D2 from the line 68. When the blade is in the ideal position relative to the wheel 6, the line 64 that defines the position on the teeth where the length of the gullet is equal to half the distance between the points of the teeth is at a distance D from the line 68, and the distance D1 is equal to D plus 1/16" whereas the distance D2 is equal to D minus 1/16". Therefore, when the blade is within the proper tracking range, the light intensity received by each of the sensor unit 64b and 64f varies substantially in accordance with a rectangular waveform, with the duty cycle of the intensity for the sensor 64b somewhat less than 50% and the duty cycle of the intensity waveform for the sensor 64f somewhat more than 50%.

Figure 9:
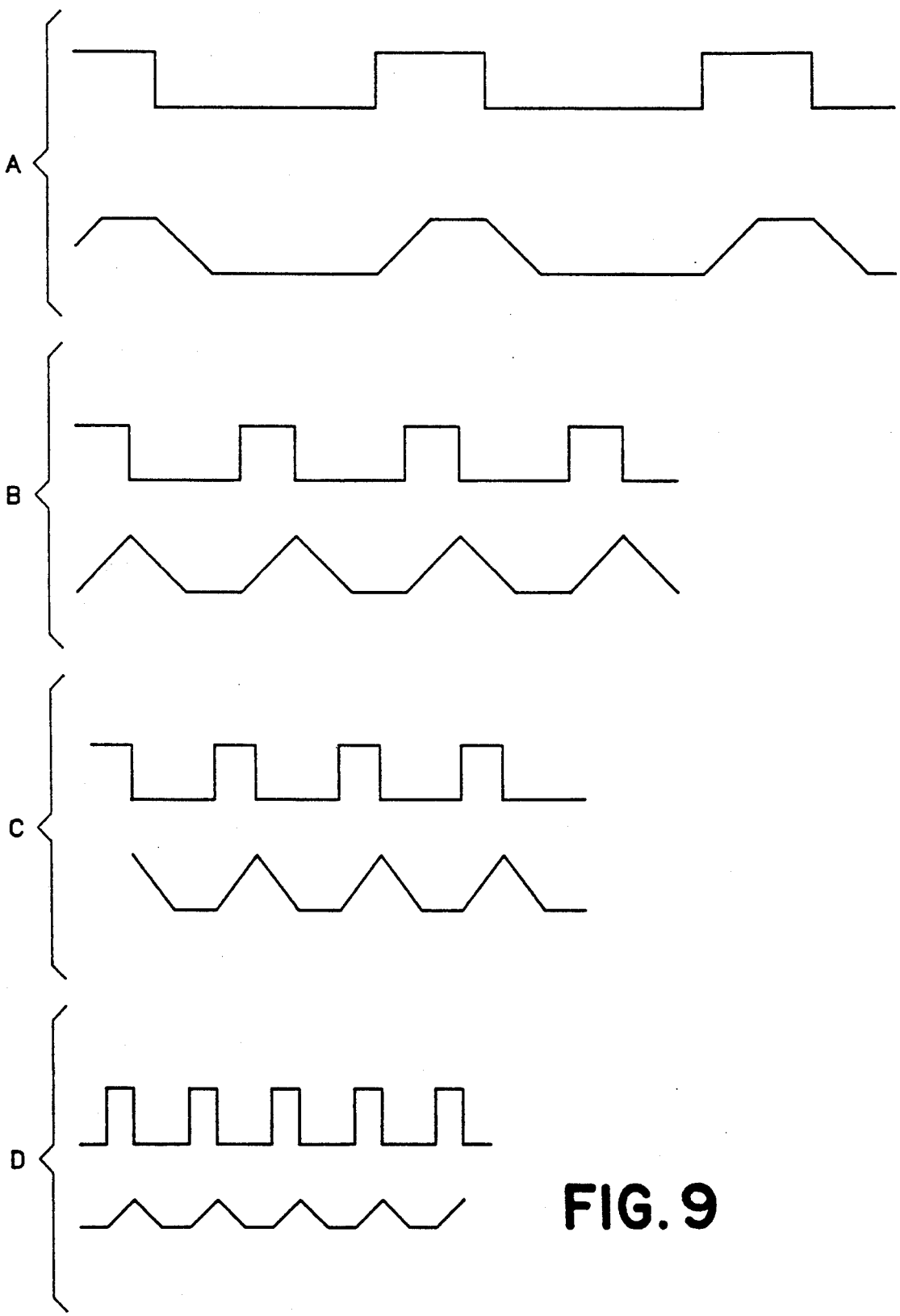
FIG. 9 illustrates waveforms used in explaining the operation of the tilt mechanisms.

In an embodiment of the invention, the saw blade is driven at a speed of 10,000 ft/min (50.80 m/s) and the teeth are at a pitch of 1.75 in (4.445 cm). Accordingly, the frequency at which the light intensity received by the sensor units 64b, 64f varies at normal operating speed is about 1143 Hz, corresponding to a period of 0.875 ms. However, when the bandmill is started, the frequency at which the light intensity received by the sensor units 64b, 64f varies is much less than 1143 Hz, and the frequency increases as the blade is accelerated. FIG. 9 illustrates four pairs of waveforms A, B, C, and D, in which the upper waveform of each pair represents the variation in light intensity received by the unit 64b at a given blade speed and the lower waveform represents the corresponding variation in the output voltage provided by the unit 64b.

The PLC 72 includes digital filters 72b, 72f which receive the output signals provided by the sensor units 64b, 64f and provide bi-level output signals for analysis by the PLC. The output signal provided by the filter 72b or 72f is high if the duty cycle of the intensity waveform received by the appropriate sensor unit is greater than 50% and low if the duty cycle is less than 50%. During start-up of the bandmill, the digital filters are adjusted to take account of the progressive increase in the frequency of the intensity waveforms. Adjustment of the filters is performed automatically as a function of time, because variations in the rate at which the speed of the blade increases during start-up are quite small.

When the path of the blade shifts forwards from the ideal position by more than 1/16", the duty cycle of the intensity waveform for the sensor unit 64b becomes greater than 50% and therefore the output voltage provided by the filter 72b will go high. Conversely, when the path shifts backwards from the ideal position by more than 1/16", the duty cycle of the intensity waveform for the unit 64f becomes less than 50% and the output signal provided by the filter 72f will go low. The signals provided by the filters 72b and 72f therefore indicate whether the path along which the saw blade is passing is within the proper range. If the blade is displaced vertically by more than about 1 inch from its ideal position, the intensity of reflected light received by the sensor units 64 is not sufficient to cause the detector to respond and accordingly the output voltages provided by the sensor units go low.

During operation of the bandmill, the PLC functions both in a control mode and in a diagnostic mode. In the control mode, action is taken by the PLC on the basis of the output provided by a single sensor unit 64f or 64b. In particular, if the output voltage of the filter 72b goes high, indicating that the blade is forward of the proper tracking range, the PLC provides an output signal to energize the solenoid 138b momentarily. Energization of the solenoid 138b causes the valve 38 to deliver fluid to the double-acting cylinder 30 in the sense to force the backward end of the arbor 12 away from the arbor 10 relative to the forward end of the arbor 12. This change in the orientation of the idler wheel tends to shift the blade backwards. Conversely, if the output voltage provided by the filter 72f goes low, the solenoid 138f is energized and the resulting change in orientation of the idler wheel tends to shift the blade forwards. The delay time through the sensors, the PLC and valve drive solenoids 138f, 138b, between the blade shifting out of the proper tracking range and the valve 38 being adjusted in response thereto, is about 50 ms. In order to prevent overcompensation, the controller 72 samples the outputs of the filters 72b, 72f at intervals longer than 50 ms, so that the effect of each adjustment of the valve 38 on the output signals of the filters 72b, 72f can be observed before another adjustment is made.

The third sensor unit 64c is positioned to illuminate, and receive light reflected from, a region of the blade that is in the center of the blade with respect to the direction of lumber flow. Normally, the output signal provided by the unit 64c is high. In the diagnostic mode, the PLC diagnoses hardware faults in the tracking control system. In particular, if the output signals of the filters 72b and 72f are high and the output signal of the sensor unit 64c is low, an indication is given that the sensor unit 64c is faulty; and if the output signals of the filter 72b and the sensor unit 64c are high but that of the filter 72f is low, an indication is given that the sensor unit 64b is faulty. Also, if the tracking of the blade is being adjusted, by energizing one of the solenoids 138b, 138f, and adjustment continues over more than 20 seconds without the blade being detected as having been restored to the proper tracking range, an indication of a fault in the double-acting solenoid valve is given.

The PLC is also able to diagnose faulty conditions in the sawing operation: if the output signals of the filter 72f and the sensor unit 64c both go low while the output signal of the load cell remains at an acceptable level, an indication that the blade is snaking is given, and the log feed is slowed down or stopped. If slowing or stopping the log feed does not result in the output signal of the filter 72f and the sensor unit 64c going high, the motor 17 is stopped. If the output signal of the sensor unit 64c goes low and the output signal of the load cell indicates that the tension in the blade is too low, an indication that the blade is broken is given, and the motor 17 is stopped.

Switches 139f and 139b are connected to the solenoids 138f and 138b to allow manual adjustment of the valve 38. Similarly, a switch 135 is provided to allow the motor to be stopped under operator control.

Figure 3:
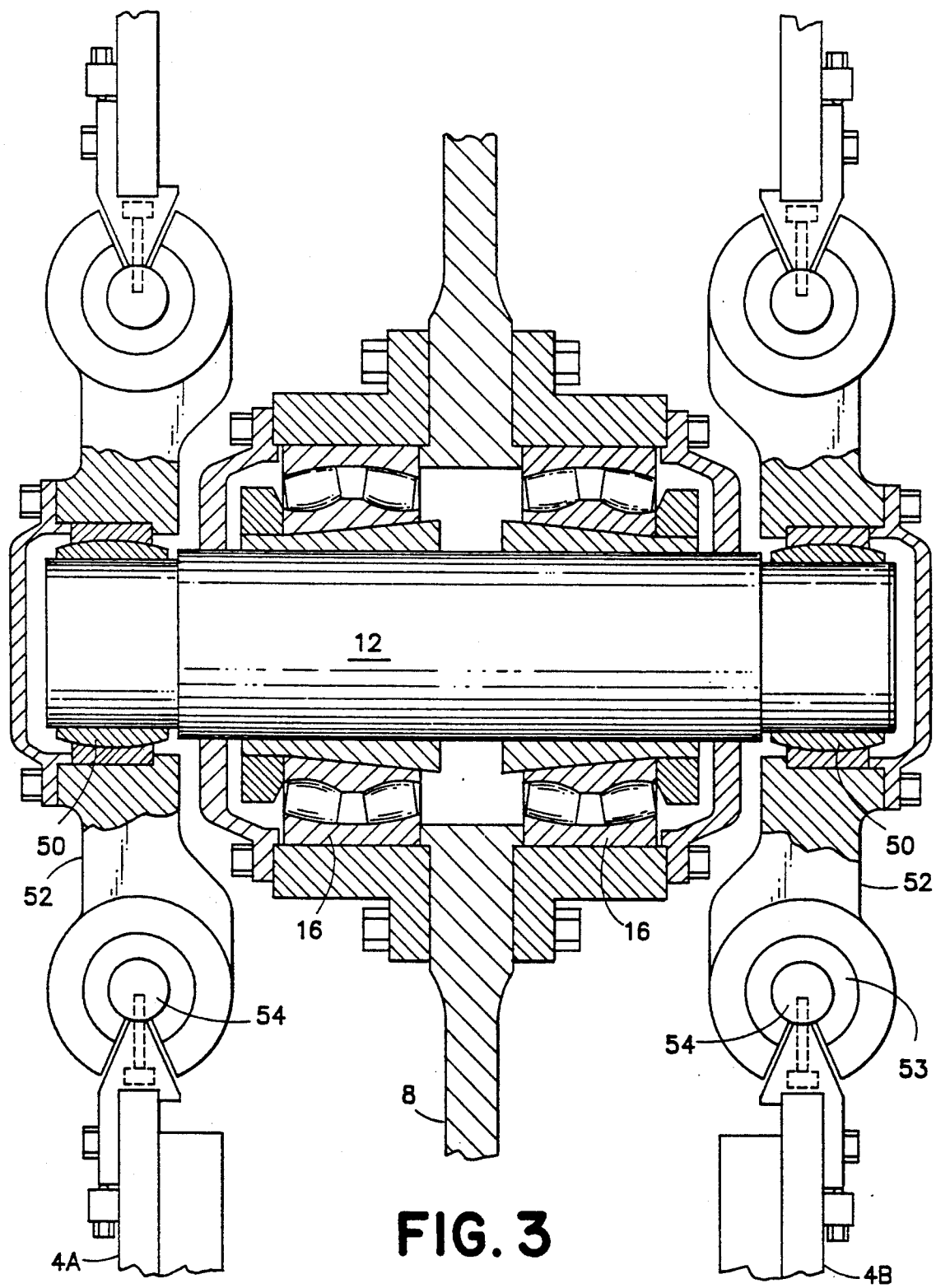
FIG. 3 is a vertical sectional view to an enlarged scale showing the manner of mounting of the idler wheel of the FIG. 1 bandmill.
Figure 4:
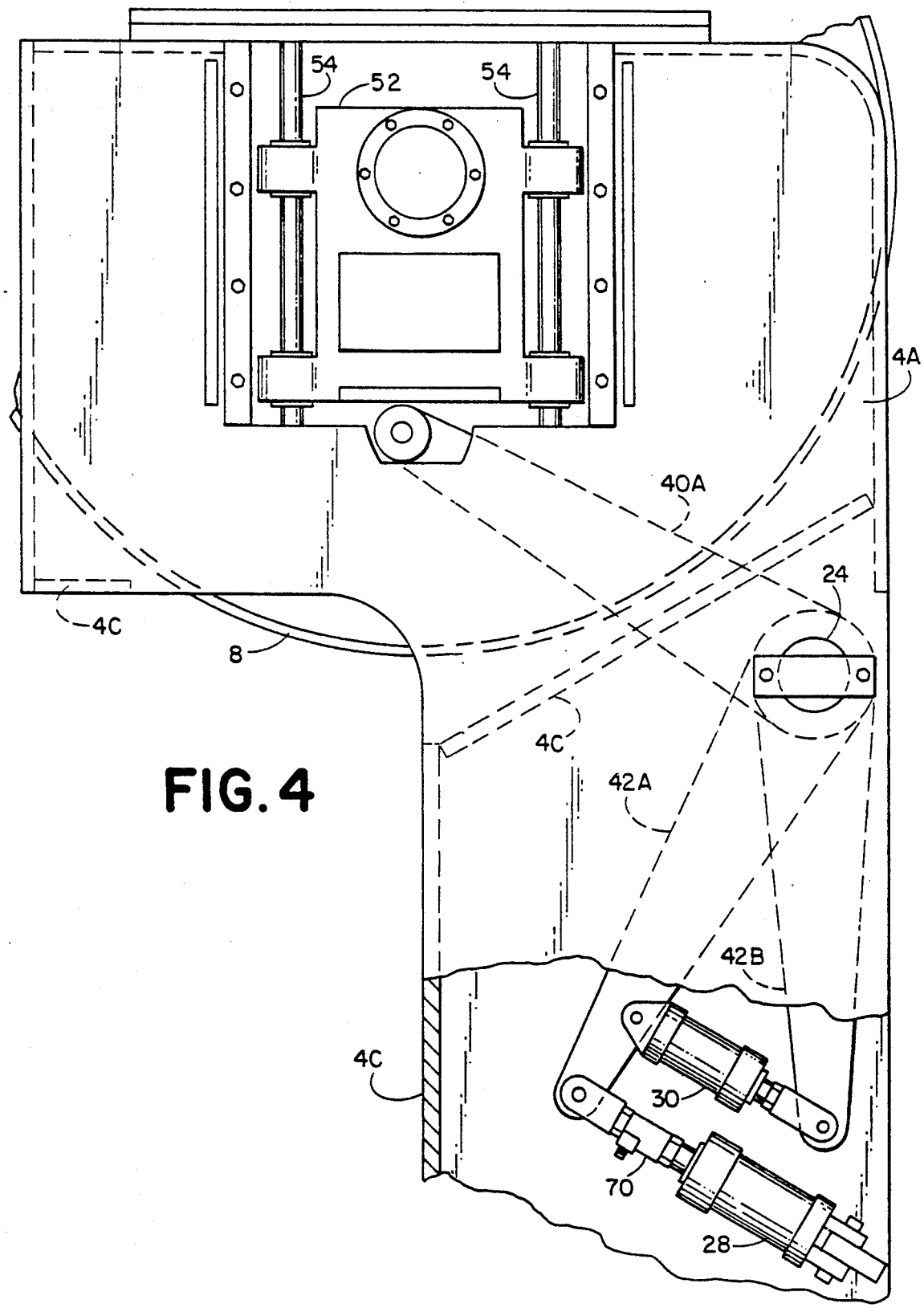
FIG. 4 is a side elevation, partly cut away, showing the idler wheel of the FIG. 1 bandmill and the tilt and strain mechanisms therefor.
Figure 10:
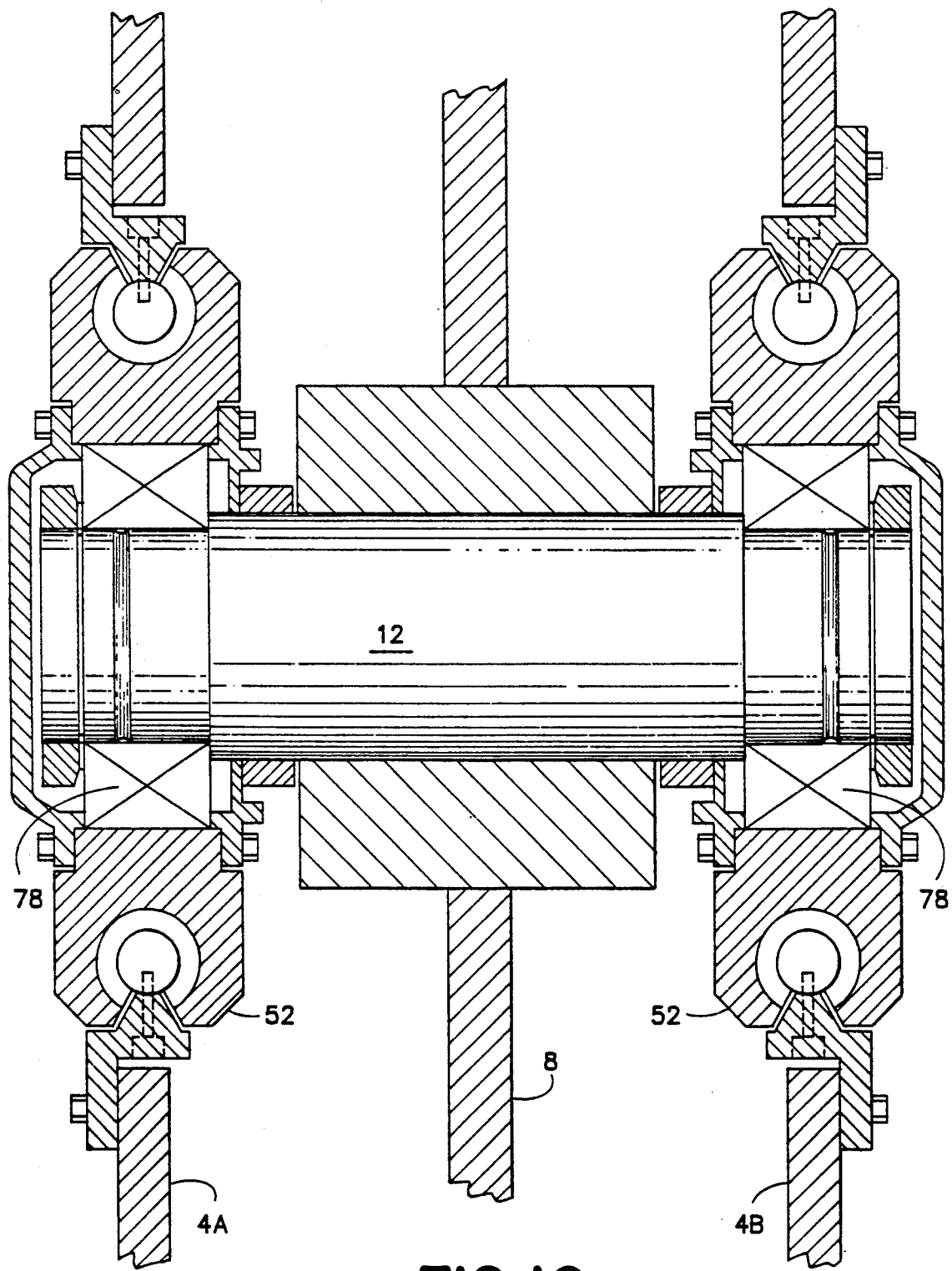
FIG. 10 illustrates a modification of FIG. 3.

FIG. 10 shows a modification of FIG. 3, according to which the upper wheel 8 is keyed to the arbor 12. The opposite ends of the arbor are journalled in bearings 78 which are supported by the carriages 52. The bearings 78 permit both tilting and rotation of the arbor 12.

The bandmill shown in FIGS. 11 and 12 is a three-wheel bandmill having a driven wheel 6 and two idler wheels 8 and 80. The idler wheel 8 is keyed to the arbor 12, and the arbor 12 is mounted in the support frame 4 by means of bearings (not shown) which are stationary relative to the bearings of the arbor 10. The third wheel is supported by bearings on an arbor 82 which is mounted in the support frame 4 by way of a lever assembly comprising levers 22A' and 22B'. The levers 22' pivot about the central axis of a shaft 24', and each lever has two arms 40' and 42'. At their ends farther from the shaft 24', the arms 40' carry respective spherical bearings 84. The two spherical bearings 84 receive the opposite ends of the arbor 82. At its end farther from the shaft 24', of a hydraulic cylinder 28 and is coupled to the arm 42B' by way of a hydraulic cylinder 30.

The bandmills illustrated in FIGS. 1-10 are preferred over that of FIGS. 11 and 12 because the wheel 80 of the FIGS. 11 and 12 bandmill is much smaller in diameter than the wheels 6 and 8 and therefore the blade undergoes more severe bending stresses when passing around the wheel 80 than when passing around the wheels 6 and 8.

It will be appreciated that the present invention is not restricted to the particular embodiments that have been described and illustrated, and that variations may be made therein without departing from the scope of the invention as defined in the appended claims and equivalents thereof. For example, it is not essential to the invention in its broadest aspects that the tilting of the wheel 8 or 80 take place by applying forces in the same direction as the forces used to tension the saw blade. Other methods of sensing the path followed by the saw blade than use of photodetectors in the manner described above may be used. The invention is not restricted to the load cell being in the position shown in the drawings. Two load cells may be provided between the arbor 12 and the lever assemblies 40a and 40b respectively.

We claim:

1. A bandmill comprising a support frame, a first wheel, an arbor having two opposite ends and on which the first wheel is mounted for rotation about an axis thereof, two carriages in which the two opposite ends of the arbor are received respectively and which are movable relative to the support frame, a second wheel mounted in the support frame for rotation about an axis of the second wheel, an endless saw blade trained about the wheels, a differential lever assembly having first and second levers which are mounted pivotally to the support frame and engage the two carriages respectively, tensioning means for forcing the first wheel away from the second wheel so as to place the saw blade under tension, tension control means for measuring the tension in the blade and acting automatically upon the tensioning means to maintain the tension in the blade within a predetermined range, tilt means for adjusting the angular position of the axis of rotation of the first wheel relative to the axis of rotation of the second wheel, and tilt control means for sensing the path along which the blade passes and acting automatically upon the tilt means for maintaining the path of the blade within a predetermined range, and wherein the tensioning means and the tilt means comprise a first force member which is effective between the support frame and the first lever and a second force member which is effective between the second lever and the first lever.

2. A bandmill according to claim 1, wherein the tensioning control means comprise a force sensor which is effective to measure the value of the force applied to the first lever by the first force member, and a controller which receives the measured value of the force applied to the first lever by the first force member and controls the first force member to maintain the measured value substantially equal to a predetermined value.

3. A bandmill according to claim 2, wherein the force sensor comprises a load cell disposed between the first force member and the first lever.

4. A bandmill according to claim 1, wherein the tilt control means comprise sensor means for sensing the path along which the blade passes, and a controller which determines whether the sensed path substantially coincides with the predetermined path and controls the second force member to maintain the sensed path in substantial coincidence with the predetermined path.

5. A bandmill according to claim 4, wherein the sensor means comprise first and second photodetectors for collecting light reflected from the saw blade and generating electrical signals representative of the power at which light is received by the photodetectors respectively, the first photodetector being positioned to collect light reflected from the teeth of the blade when the blade is passing along the proper path and the second photodetector being positioned to collect light reflected from the body of the blade when the blade is passing along the proper path.

6. A bandmill according to claim 4, wherein the sensor means comprise first and second sensor units, which are stationary with respect to the support frame, for collecting light reflected from the saw blade and generating electrical signals representative of the duty cycle at which reflected light is collected by the sensor units respectively as the saw blade is driven along its path of movement, whereby the sensor units scan the saw blade, the sensor units being positioned to scan the saw blade along paths that cross the teeth of the blade at different levels of the teeth between the gullets and the tips of the teeth, whereby the duty cycle at which reflected light is collected by each sensor unit depends on the position of the blade relative to the predetermined path.

7. A bandmill according to claim 6, wherein the positions of the first and second sensor units are selected such that when the blade is on the predetermined path, the duty cycle at which reflected light is collected by the first sensor unit is less than 50% and the duty cycle at which reflected light is collected by the second sensor unit is greater than 50%, and the controller responds to the first sensor unit collecting reflected light at a duty cycle of more than 50% or the second sensor unit collecting reflected light at a duty cycle of less than 50% by controlling the second force member to restore the blade to the predetermined path.

8. A bandmill according to claim 7, further comprising a third sensor unit, which is stationary with respect to the support frame, for collecting light reflected from the saw blade and generating an electrical signal representative of the power at which reflected light is collected by the third sensor unit as the blade is driven along its path of movement, whereby the third sensor unit scans the saw blade, the third sensor unit being positioned to scan the saw blade along a path that is substantially equidistant from the back of the blade and the gullets of the teeth of the blade, and wherein the controller is programmed to provide a fault indication if the controller receives a signal from the third sensor unit indicating that it is collecting reflected light at a predetermined power and receives a signal from the first sensor unit indicating that it is collecting light at a duty cycle of more than 50% but the controller does not receive a signal from the second sensor unit indicating that it is collecting light at a duty cycle of more than 50%.

9. A bandmill according to claim 6, further comprising a third sensor unit, which is stationary with respect to the support frame, for collecting light reflected from the saw blade and generating an electrical signal representative of the power at which reflected light is collected by the third sensor unit as the blade is driven along its path of movement, whereby the third sensor unit scans the saw blade, the third sensor unit being positioned to scan the saw blade along a path that is substantially equidistant from the back of the blade and the gullets of the teeth of the blade.

10. A bandmill according to claim 9, wherein the third sensor unit is connected to the controller and the controller is programmed to provide a fault indication if the output signals provided by the first and second sensor units indicate that they are collecting light reflected from the teeth of the blade but the controller does not receive a signal indicating that the third sensor unit is collecting reflected light at a predetermined power level.

11. A bandmill according to claim 9, wherein the tension control means comprise a force sensor which is effective to measure the value of the force applied to the first lever by the first force member, and the controller receives the measured value of the force applied to the first lever by the first force member and controls the first force member to maintain the measured value substantially equal to a higher predetermined value, and the controller is programmed to provide a fault indication if the measured value of the force applied to the first lever by the first force member falls to a lower predetermined value and the controller does not receive a signal from the third sensor unit indicating that it is collecting reflected light at a predetermined power.

12. A bandmill according to claim 1, wherein the first and second force members are hydraulic cylinders.

13. A bandmill according to claim 1, wherein the support frame comprises two column members and means connecting the column members and maintaining them in spaced, substantially parallel relationship, and the first and second wheels are disposed in the space between the two column members.

14. A bandmill according to claim 13, wherein the two carriages are mounted to the two column members respectively and are movable independently of each other relative to the support frame, whereby the angular position of the first wheel relative to the support frame is adjustable, and the bandmill further comprises a second arbor having two opposite ends and on which the second wheel is mounted, the two opposite ends of the second arbor being mounted to the two column members respectively in a manner preventing movement of the second arbor relative to the support frame in directions perpendicular to said axis of rotation of the second wheel.

15. A bandmill according to claim 13, wherein the first and second levers are disposed in the space between the two column members.

16. A bandmill according to claim 15, wherein each lever has first and second arms and the first arms of the two levers engage the two carriages respectively, and the first force member is effective between the support frame and the second arm of the first lever and the second force member is effective between the second arm of the second lever and the second arm of the first lever.

17. A bandmill according to claim 1, wherein each lever has a first arm and a second arm, the first arms of the two levers engaging the two carriages respectively, and the first force member is effective between the support frame and the second arm of the first lever and the second force member is effective between the second arm of the second lever and the second arm of the first lever.

18. A bandmill having first, second and third wheels, means supporting the wheels for rotating about respective axes, and endless saw blade trained about the wheels, tensioning means effective to force the first wheel away from the second wheel so as to place the saw blade under tension, tension control means for measuring the tension in the blade and acting upon the tensioning means to maintain the tension at a predetermined value, tilt means for adjusting the angular position of the axis of rotation of the first wheel relative to the axis of rotation of at least one other wheel, and tilt control means for sensing the path along which the blade passes and acting upon the tilt means for maintaining the blade on a predetermined path.

19. A bandmill according to claim 18, wherein the second and third wheels are of substantially the same diameter and the first wheel is of lesser diameter than the second and third wheels.

20. A bandmill according to claim 18, comprising a support frame in which the second and third wheels are mounted, an arbor having two opposite ends and on which the first wheel is mounted, and a lever assembly having two levers by which the two opposite ends of the arbor are supported respectively, wherein the two levers are mounted to pivot about a common axis which is parallel to the axes of rotation of the second and third wheels and is stationary with respect thereto, and wherein the tensioning means and the tilt means comprise a first force member which is effective between the support frame and one of the two levers and a second force member which is effective between said one lever and the other lever.

21. A bandmill comprising a support frame, a first wheel, an arbor having two opposite ends and on which the first wheel is mounted for rotation about an axis thereof, first and second arbor supports which the two opposite ends of the arbor are received respectively and which are movable relative to the support frame, a first link member effective on the first arbor support, a second link member effective on the second arbor support, a second wheel mounted in the support frame for rotation about an axis of the second wheel, an endless saw blade trained about the wheels, tensioning means effective to force the first wheel away from the second wheel so as to place the saw blade under tension, tension control means for measuring the tension in the blade and acting automatically upon the tensioning means to maintain the tension within a predetermined range, tilt means for adjusting the angular position of the axis of rotation of the first wheel relative to the axis of rotation of the second wheel, and tilt control means for sensing the path along which the blade passes and acting automatically upon the tilt means for maintaining the path of the blade within a predetermined range, and wherein the tensioning means comprise first force means effective between the support frame and the first link member and the tilt means comprise second force means effective between the first link member and the second link member.

22. A bandmill according to claim 21, wherein the tension control means comprise a transducer that provides a signal dependent on the force applied to the first link member by the first force means, and a controller responsive to the transducer for controlling the first force means.

23. A bandmill comprising a support frame, a first wheel, a first arbor having two opposite ends and on which the first wheel is mounted for rotation about an axis thereof, two carriages in which the two opposite ends of the first arbor are received respectively and which are movable relative to the support frame, a second wheel mounted in the support frame for rotation about an axis of the second wheel, an endless saw blade trained about the wheels, tensioning means effective to force the first wheel away from the second wheel so as to place the saw blade under tension, tension control means for measuring the tension in the blade and acting automatically upon the tensioning means to maintain the tension within a predetermined range, tilt means for adjusting the angular position of the axis of rotation of the first wheel relative to the axis of rotation of the second wheel, and tilt control means for sensing the path along which the blade passes and acting automatically upon the tilt means for maintaining the path of the blade within a predetermined range, and wherein the support frame comprises first and second frame members between which the first wheel and the second wheel are disposed and on which the two carriages are respectively mounted, the bandmill also comprising a second arbor on which the second wheel is mounted, the second arbor being supported by the first and second frame members at locations spaced apart along the second arbor.

24. A bandmill according to claim 23, wherein the second wheel is keyed to the second arbor, and the second arbor is journaled in first and second bearings received by the first and second frame members respectively.

25. A bandmill comprising a support frame, a first wheel, an arbor having two opposite ends and on which the first wheel is mounted for rotation about an axis thereof, two carriages in which the two opposite ends of the arbor are received respectively and which are movable relative to the support frame, a second wheel mounted in the support frame for rotation about an axis of the second wheel, an endless saw blade trained about the wheels, tensioning means effective to force the first wheel away from the second wheel so as to place the saw blade under tension, tension control means for measuring the tension in the blade and acting automatically upon the tensioning means to maintain the tension within a predetermined range, tilt means for adjusting the angular position of the axis of rotation of the first wheel relative to the axis of rotation of the second wheel, and tilt control means for sensing the path along which the blade passes and acting automatically upon the tilt means for maintaining the path of the blade within a predetermined range, and also comprising bearing means whereby the first wheel is supported for rotation about the arbor, and first and second spherical bearings whereby said two opposite ends of the arbor are supported by the carriages respectively.

26. A bandmill comprising a support frame, a first wheel, an arbor having two opposite ends and on which the first wheel is mounted for rotation about an axis thereof, two carriages in which the two opposite ends of the arbor are received respectively and which are movable relative to the support frame, a second wheel mounted in the support frame for rotation about an axis of the second wheel, an endless saw blade trained about the wheels, a differential lever assembly having first and second levers which are mounted pivotally to the support frame, the two levers engaging the two carriages respectively, tensioning means effective to force the first wheel away from the second wheel so as to place the saw blade under tension, tension control means for measuring the tension in the blade and acting automatically upon the tensioning means to maintain the tension within a predetermined range, tilt means for adjusting the angular position of the axis of rotation of one of the wheels relative to the axis of rotation of the other wheel, and tilt control means for sensing the path along which the blade passes and acting automatically upon the tilt means for maintaining the path of the blade within a predetermined range, and wherein the tensioning means and the tilt means comprise a first force member effective between the support frame and the first lever and a second force member effective between the second lever and the first lever.

* * * * *

UNITED STATES PATENT AND TRADEMARK OFFICE
CERTIFICATE OF CORRECTION

PATENT NO. : 5,176,055
DATED : January 5, 1993
INVENTOR(S) : Ralph Wijesinghe et al.

It is certified that error appears in the above-identified patent and that said Letters Patent is hereby corrected as shown below:

Column 3, line 48, "threewheel" should read --three-wheel--.

Column 4, line 57, "Wheel" should read --wheel--.

Column 6, line 9, after "intensity" insert --waveform--.

Column 8, lines 3-4, after "24'," insert --the arm 42A' is coupled to the support frame by way--.

Column 8, lines 56-57 (Claim 2), "tensioning control means" should read --tension control means--.

Signed and Sealed this

Sixteenth Day of November, 1993

Attest:

BRUCE LEHMAN

*Attesting Officer*   *Commissioner of Patents and Trademarks*